United States Patent [19]

Gildner

[11] 3,782,709

[45] Jan. 1, 1974

[54] PULSE DAMPENER

[75] Inventor: Kenneth J. Gildner, North Palm Beach, Fla.

[73] Assignee: Milton Roy Company, St. Petersburg, Fla.

[22] Filed: Mar. 30, 1972

[21] Appl. No.: 239,749

[52] U.S. Cl. .............................................. 267/114
[51] Int. Cl. ................................................ F16f 5/00
[58] Field of Search .................. 267/114, 121, 122, 267/137

[56] References Cited
UNITED STATES PATENTS

| 3,625,401 | 12/1971 | Terry | 267/114 |
| 2,377,461 | 6/1945 | Swift | 267/114 |

Primary Examiner—James B. Marbert
Attorney—Robert A. Buckles et al.

[57] ABSTRACT

A pulse dampener particularly advantageous for removing cyclical pressure gradients produced by the positive displacement pump in a liquid chromatographic system. It comprises a bellows which substantially fills a cylindrical chamber. The chamber is connected to the pump outlet and column inlet. A compression spring expands the bellows against the force of the liquid. Compression of the spring is adjusted by a screw thread and two stops limit the permissible travel of the bellow face.

The foregoing abstract is not to be taken either as a complete exposition or as a limitation of the present invention, and in order to understand the full nature and extent of the technical disclosure of this application, reference must be had to the following detailed description and the accompanying drawings as well as to the claims.

10 Claims, 6 Drawing Figures

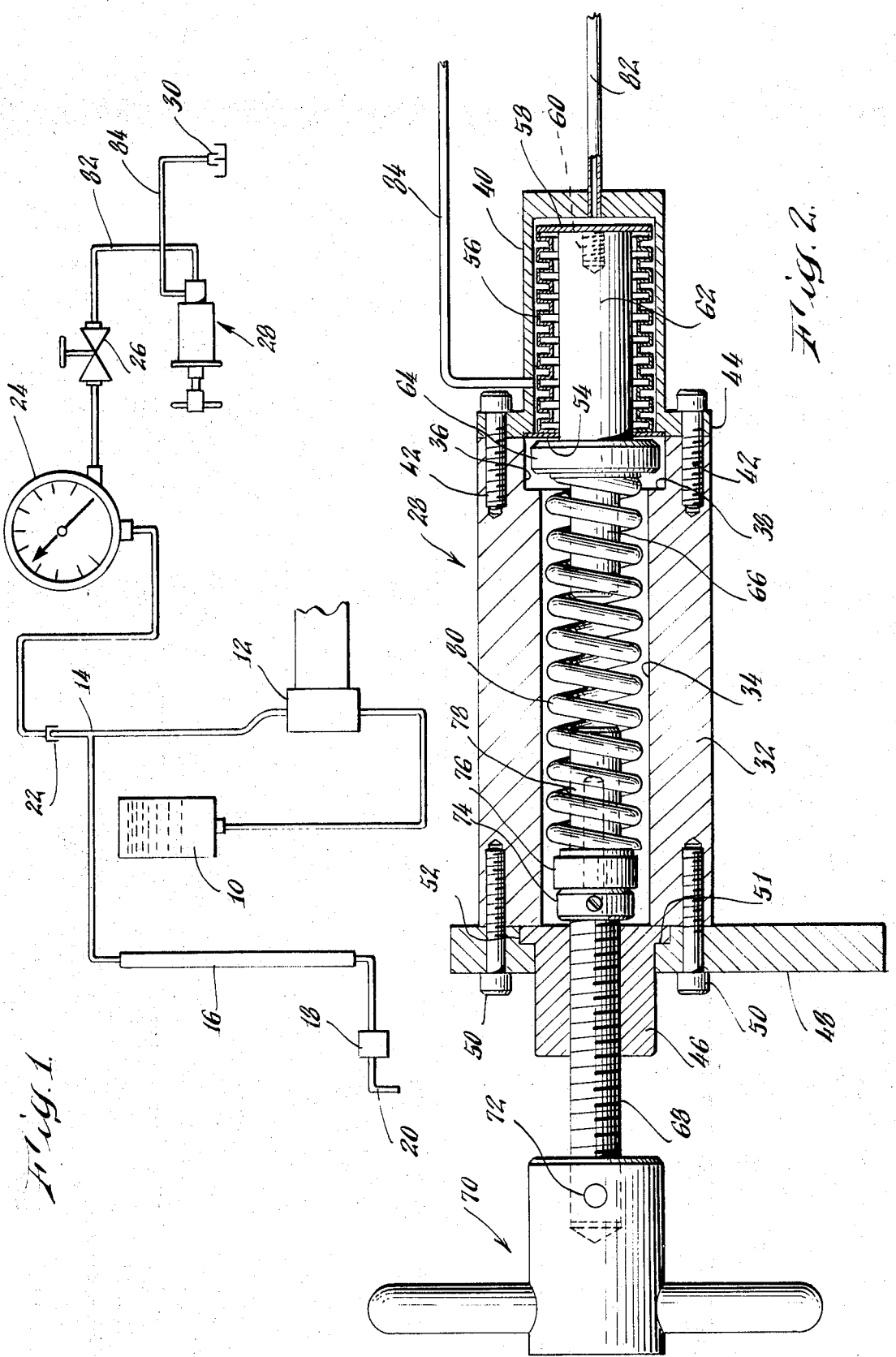

PULSE DAMPENER

BACKGROUND OF THE INVENTION

The use of a reciprocating pump to move liquid through a chromatographic column or other instruments can produce severe cyclic pressure gradients. These pressure gradients follow the pumping frequency and produce synchronous changes in flow rate. In many instances, these periodic changes in pressure and flow make it possible to obtain and record data using sensitive instruments. In these situations, the use of a dampening system is indicated.

One of the simplest dampening systems consists of a Bourdon type pressure gauge connected near the pump outlet. It is important that the pressure gauge not be restricted (snubbed) in order to reduce its pointer movement. A length of capillary tubing is also connected between the pump outlet and the instrument it is supplying. This tubing serves as a resistance which forces a portion of each positive pump stroke to be stored in the pressure gauge. During the suction stroke of the pump's piston, the stored fluid in the pressure gauge is returned to the fluid stream and thereby tends to fill in the off periods of the pumping cycle. The effectiveness of this arrangement is limited to very low flow rates, since it is impossible for the pressure gauge to return fluid in any quantity to a system without a substantial loss of pressure. Most pressure gauges will show a change of at least 1,000 psi for a gain or loss of one drop of fluid.

The regularly occurring pressure pulses are generated during the forward stroke of the pump's piston when it is forcing liquid out of the pump head. The frequency at which this occurs is dependent on the pump speed. At 30 strokes per minute, pressure pulses occur thirty times per minute. During the remaining thirty seconds (suction strokes) the pump head is refilling on the return piston stroke. The analogous electrical equivalent of these pressure pulses is a pulsating dc voltage. The amplitude of the pressure pulses is a function of the resistance in the system in the form of tubing, valves, and packed columns. If there is no resistance to flow, a pressure pulse will not be seen. However, the liquid flow velocity will still change. Therefore, if the pump is operated with even a minimum amount of resistance, there will still be large flow changes. Dampening occurs when the suction stroke periods in the pressure cycle are filled in with fluid under pressure so that it can flow against the resistance offered by the system. One of the best and least expensive ways of accomplishing dampening is to use part of the same fluid which was moved out of the pump during the previous positive stroke. This method eliminates the need for a second pump or pump head. The addition of a second pump head adds undesirable dead volume to a system and will amplify any small leak in the pump's valving system, making it difficult to establish constant flow at low flow rates. In order to utilize part of the fluid from the forward piston stroke, it must be stored under pressure until the following suction stroke occurs. A very important criteria which must be met in order to produce effective dampening is to return the stored fluid at the same pressure at which the system is operating. A simple pressure gauge cannot accomplish this because, as it returns fluid to a system, the pressure changes rapidly as indicated by the large change in pressure seen on the gauge. This, of course, refers to a gauge which is not snubbed to reduce surging of the pointer. A snubbed gauge only indicates the average pressure and does not contribute to dampening the system. The very fact that the snubbed gauge does not move allows large pressure and flow changes to occur in the system.

Accordingly, it is a primary object of the present invention to provide a pulse dampener for a liquid hydraulic system including a positive displacement pump. Other objects are to provide such a dampener which stores fluid on each positive pump stroke and returns it on each suction stroke; which maintains closely controlled fluid pressure; and which maintains substantially constant fluid velocity. Other objects, features, and advantages will become apparent from the following description and appended claims.

BRIEF DESCRIPTION OF THE DRAWINGS

The invention is illustrated in the accompanying drawings wherein:

FIG. 1 is a schematic diagram of a liquid chromatographic system incorporating the pulse dampener of this invention;

FIG. 2 is a cross section of a pulse dampener in accordance with the invention.

DESCRIPTION OF THE PREFERRED EMBODIMENT

Figure 3:
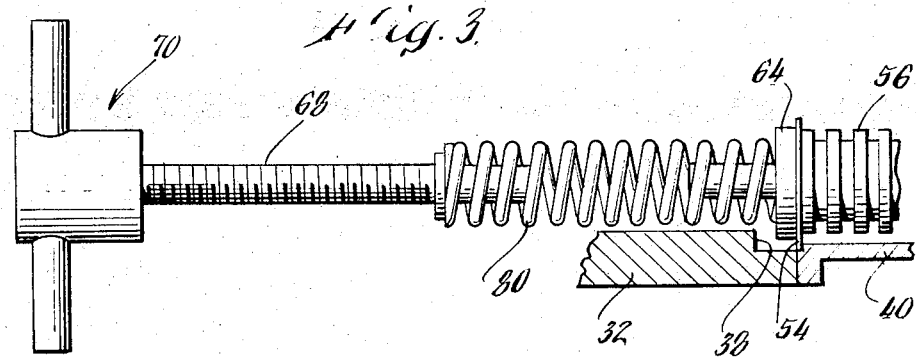
FIGS. 3–6 are illustrations of the various modes of operation of the pulse dampener of the invention.

With particular reference to FIG. 1, there is illustrated a liquid chromatographic system comprising a solvent reservoir 10 connected through a pump 12 to a tee 14. One arm of the tee is connected to the inlet of a chromatographic column 16. The output end of the column 16 is connected through a detector 18 to waste 20. Another arm of tee 14 is connected to sample input port 22 and to a pressure gauge 24 of the flow through type. The remaining port of the pressure gauge 24 is connected through a bellows valve 26 to pulse dampener 28. The pulse dampener also being connected to a purge port 30.

FIG. 2 illustrates the construction of the pulse dampener 28. It comprises a cylindrical housing 32 which defines a cylindrical spring chamber 34 which terminates at one end at an enlarged recess 36 forming a shoulder 38 which functions as an upper limit stop, as will be later explained. Securely mounted at the same end of the housing 32 is a cylindrical bellows can 40 secured to the housing by means of bolts 42 extending through flange 44. At the opposite end of housing 32 is an internally threaded guide 46 mounted on the housing by means of mounting plate 48 and bolts 50. The mounting plate defines an annular recess 51 engaging a flange 52 of the guide.

The bellows can 40 at the end adjoining housing 32 carries an annular end wall 54 upon which is mounted the fluid tight diaphragm 56 which substantially fills the can 40 and includes a bottom wall 58. The bottom wall 58 is secured by suitable means, such as screw 60, to a stem 62 which passes through the opening in the annular wall 54. An enlarged collar 64 on stem 62 is positioned in the recess 36 and a pin portion 66 of the stem extends axially into spring chamber 34. A threaded adjusting rod 68 is mounted in the guide 46 and carries at its outer end a handle 70 secured with a dowel 72. The end of adjusting rod 68 which is within the spring chamber 34 carries a collar 74 having an enlarged head 76 and pin 78. A compression spring 80 is mounted within the spring chamber 34 with one end bearing against the spring guide head 76 and the other end bearing against the pin portion 66 of the stem 62. The bellows can 40 is connected to the chromatographic system by an input line 82 passing through its outer end wall. It is an important feature of the invention that the input line 82 is always open to the space between diaphragm 56 and the bellows can 40. This is true even when collar 64 abuts the limit stop formed by end wall 54. A purge line 84 is connected through the side of bellows can 40 to purge port 30.

FIGS. 3–6 illustrate the various modes of operation of the dampener of this invention. FIG. 3 illustrates the "partial dampened" mode. This is employed for lower flow rates, in particular, and may be used at any flow rate, provided the pressure pulsations are not objectionable. The handle 70 is turned fully clockwise to fully compress the spring 80. This forces collar 64 hard against the lower limit formed by end wall 54.

Figure 4:
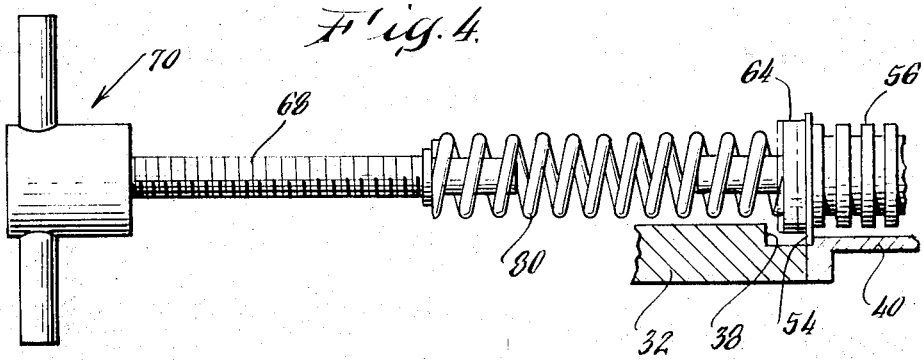

In order to introduce nulling of the pressure pulses, the handle 70 is turned partially counterclockwise. This reduces spring compression and permits the collar 64 to move off the lower limit, as shown in FIG. 4, during part of each pressure pulse, thereby reducing the pressure pulse amplitude.

Figure 5:
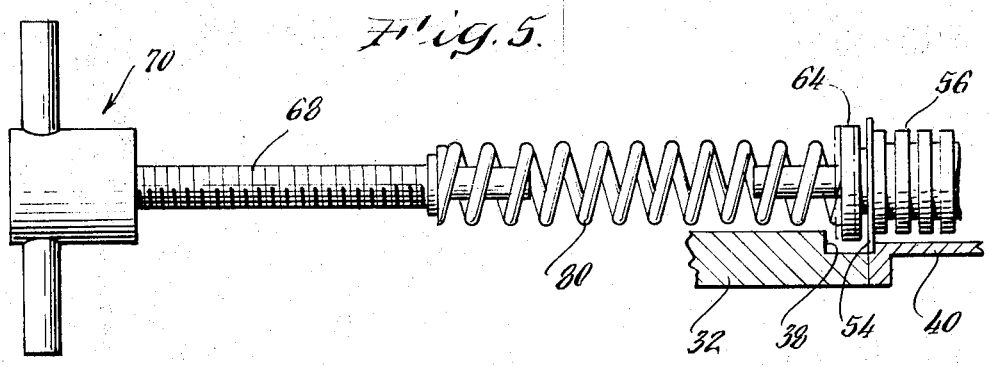

Turning handle 70 further counterclockwise, reduces spring compression slightly more. Collar 64 now becomes free floating between the upper and lower limits, as shown in FIG. 5. At this setting, the bellows automatically tracks the pressure changes in the system and full dampening results.

Figure 6:
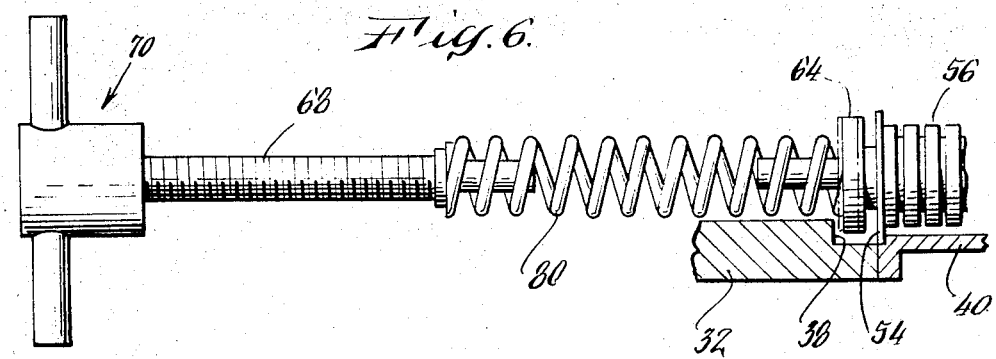

With the handle 70 in the FIG. 5 position, assume that system pressure increases. Spring compression will also increase and the collar 64 will move to a new nulling position and float between new limits, as shown in FIG. 6.

It is believed that the many advantages of this invention will now be apparent to those skilled in the art. It will also be apparent that many variations and modifications may be made therein without departing from its spirit and scope. Accordingly, the foregoing is to be construed as illustrative only, rather than limiting. This invention is limited only by the scope of the following claims.

I claim:

1. A pulse dampener for a hydraulic system which comprises: a housing defining first and second axially aligned, substantially cylindrical chambers therein; a bellows substantially filling said first chamber but defining therewith a fluid reservoir at all configurations of said bellows; fluid passage defining means for connecting said fluid reservoir with said hydraulic system; a compression spring in said second chamber; means for applying the force of said spring to expand said bellows; a limit stop positioned to limit the travel of said bellows; and means for selectively adjusting the compression of said spring.

2. The pulse dampener of claim 1 wherein said selective adjusting means comprises a rod in threaded engagement with said second chamber.

3. The pulse dampener of claim 1 wherein said force applying means comprises a stem secured to said bellows and engaging said spring.

4. The pulse dampener of claim 3 wherein said limit stop comprises: a recess defined by said second chamber; and a collar associated with said stem for movement between the limits of said recess.

5. The pulse dampener of claim 4 wherein said selective adjusting means comprises: a rod in threaded engagement with said second chamber; and an adjusting handle secured to said rod.

6. In a liquid chromatographic system including a first liquid reservoir, a chromatographic column having an inlet and an outlet, and means for pumping liquid from said reservoir to the inlet of said chromatographic column, the improvement which comprises: a housing defining first and second axially aligned chambers therein; a bellows substantially filling said first chamber but defining therewith a second liquid reservoir at all configurations of said bellows; liquid passage defining means for connecting said second liquid reservoir to the inlet of said column; a compression spring in said second chamber; means for applying the force of said spring to expand said bellows; means for limiting the travel of said bellows; and means for selectively adjusting the compression of said spring.

7. The pulse dampener of claim 6 wherein said selective adjusting means comprises a rod in threaded engagement with said second chamber.

8. The pulse dampener of claim 6 wherein said force applying means comprises a stem secured to said bellows and engaging said spring.

9. The pulse dampener of claim 8 wherein said limit stop comprises: a recess defined by said second chamber; and a collar associated with said stem for movement between the limits of said recess.

10. The pulse dampener of claim 9 wherein said selective adjusting means comprises: a rod in threaded engagement with said second chamber; and an adjusting handle secured to said rod.

* * * * *

UNITED STATES PATENT OFFICE
CERTIFICATE OF CORRECTION

Patent No. 3,782,709          Dated January 1, 1974

Inventor(s) Kenneth J. Gildner

It is certified that error appears in the above-identified patent and that said Letters Patent are hereby corrected as shown below:

Abstract, line 11, change "bellow" to --bellows--.
Column 1, line 10, change "possible" to --impossible--.
Column 2, line 8, change "hydru" to --hydra--; line 9 change "alic" to --ulic--.

Signed and sealed this 23rd day of April 1974.

(SEAL)
Attest:

EDWARD M.FLETCHER,JR.          C. MARSHALL DANN
Attesting Officer               Commissioner of Patents